(12) United States Patent
Tsuzuki et al.

(10) Patent No.: US 11,698,020 B2
(45) Date of Patent: Jul. 11, 2023

(54) VALVE MOUNTING STRUCTURE

(71) Applicant: FUTABA INDUSTRIAL CO., LTD., Okazaki (JP)

(72) Inventors: Yusuke Tsuzuki, Okazaki (JP); Arata Kobayashi, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 17/954,187

(22) Filed: Sep. 27, 2022

(65) Prior Publication Data

US 2023/0107715 A1 Apr. 6, 2023

(30) Foreign Application Priority Data

Oct. 6, 2021 (JP) ................................. 2021-164922

(51) Int. Cl.
*F01N 13/08* (2010.01)
*F01N 1/16* (2006.01)

(52) U.S. Cl.
CPC ............. *F01N 13/08* (2013.01); *F01N 1/163* (2013.01); *F01N 2240/36* (2013.01); *F01N 2310/14* (2013.01)

(58) Field of Classification Search
CPC ...... F01N 1/163; F01N 13/08; F01N 2240/36; F01N 2310/14
USPC .................................................. 60/322, 324
See application file for complete search history.

(56) References Cited

U.S. PATENT DOCUMENTS

| 5,984,045 A * | 11/1999 | Maeda ..................... F01N 1/166 181/254 |
| 6,637,449 B2 * | 10/2003 | Nagai ...................... F01N 1/166 137/315.16 |
| 9,605,581 B1 * | 3/2017 | Middleton, Jr. .......... F01N 9/00 |
| 2009/0229911 A1 * | 9/2009 | Scotti ...................... F01N 1/083 181/269 |
| 2011/0215272 A1 * | 9/2011 | Ishihata ................... F16K 1/42 251/359 |
| 2018/0245501 A1 * | 8/2018 | Tsubosaka .............. F01N 13/08 |
| 2020/0182358 A1 * | 6/2020 | Enke ..................... F01N 3/0205 |

(Continued)

FOREIGN PATENT DOCUMENTS

JP 2022082129 A 6/2022
KR 20110109486 A * 10/2011

(Continued)

*Primary Examiner* — Jorge L Leon, Jr.
(74) *Attorney, Agent, or Firm* — Withrow & Terranova, P.L.L.C.; Vincent K. Gustafson

(57) ABSTRACT

A valve mounting structure includes a mounting portion, a valve, and a cushion. The valve includes a valve seat having a cylindrical joining portion that receives the mounting portion inserted thereto, or is inserted to the mounting portion. The cushion is arranged between the mounting portion and the joining portion, and fixed to each of the mounting portion and the joining portion. In a case where one of the mounting portion and the joining portion is a first portion and the other is a second portion, the first portion includes a peripheral wall and an opening portion without the peripheral wall formed therein. A fixing portion in which the second portion and the cushion are fixed to each other is at least partly arranged at a position adjacent to the opening portion along a radial direction of the mounting portion.

8 Claims, 6 Drawing Sheets

(56) References Cited

U.S. PATENT DOCUMENTS

2020/0309277 A1\* 10/2020 Thomas .................. F01N 1/083
2022/0389849 A1\* 12/2022 Kubota .................. F01N 1/163

FOREIGN PATENT DOCUMENTS

KR   20120110642 A  \* 10/2012
WO      2016076312 A1    5/2016

\* cited by examiner

VALVE MOUNTING STRUCTURE

CROSS-REFERENCE TO RELATED APPLICATION

The present application claims the benefit of Japanese Patent Application No. 2021-164922 filed on Oct. 6, 2021 with the Japan Patent Office, the entire disclose of which is incorporated herein by reference.

BACKGROUND

The present disclosure relates to a valve mounting structure.

Some exhaust systems of internal combustion engines have a changeover valve mounted for switching exhaust flow passages using a valve body. Such a changeover valve is attached to, for example, an opening of an exhaust pipe inside a muffler. International Patent Application Publication No. WO2016/076312 discloses a valve in which a cushion is arranged on a portion of a valve seat abutting a valve body so as to inhibit a hammering sound when the valve is closed.

SUMMARY

The hammering sound may not be sufficiently inhibited only by arranging a cushion on the portion of the valve seat abutting the valve body. Besides, providing many hammering sound inhibiting members may increase the size of an exhaust system.

In one aspect of the present disclosure, it is preferable to proposes a technique to inhibit noise from being generated when a valve is closed using a valve body, while inhibiting the size of an exhaust system from being large.

One aspect of the present disclosure provides a valve mounting structure in an exhaust flow passage. The valve mounting structure comprises a mounting portion, a valve, and a cushion. The mounting portion is cylindrically shaped and forming the exhaust flow passage. The valve is mounted on the mounting portion. The valve comprises a valve seat and a valve body for closing the exhaust flow passage. The valve seat includes a cylindrical joining portion receiving the mounting portion inserted to the cylindrical joining portion, or being inserted to the mounting portion. The cushion is arranged between the mounting portion and the joining portion, and fixed to each of the mounting portion and the joining portion. In a case where one of the mounting portion and the joining portion is a first portion and the other of the mounting portion and the joining portion is a second portion, the first portion includes a peripheral wall and an opening portion without the peripheral wall formed therein. A fixing portion in which the second portion and the cushion are fixed to each other is at least partly arranged at a position adjacent to the opening portion along a radial direction of the mounting portion.

With such a configuration, it is possible to achieve both reduction of noise generation and downsizing of the valve mounting structure in the exhaust flow passage. Noise generation can be inhibited for the following reasons. Vibrations generated by the valve seat when the valve body is closed are attenuated by the cushion. The cushion also inhibits the vibrations generated in the valve from being transmitted to the exhaust flow passage. For these reasons, it is possible to reduce noise generated by chattering caused by exhaust pulsation. Furthermore, in the above-described configuration, the fixed position of the first portion and the cushion (hereinafter referred to as a first fixed position) and the fixed position of the second portion and the cushion (hereinafter referred to as a second fixed position) are arranged at different positions in the cushion. This arrangement results in inhibiting the vibrations from being easily transmitted, as compared with a case in which the first fixed position and the second fixed position are located adjacent to each other. Thus, it is possible to achieve a good vibration attenuating effect.

Downsizing can be explained with the following reasons. In a case where the position of fixing portion, that is the second fixed position is located at a position that is not adjacent to the first portion along the radial direction of the mounting portion (hereinafter simply referred to as the radial direction), forming the fixing portion is easy for manufacturing and thus preferable. If the above-described opening portion is not formed, the second fixed position would be located in the second portion away at least from the end of the first portion which is adjacent to the second portion. In contrast, with the opening portion formed as in one aspect of the present disclosure, it is possible to provide at least a portion of the second fixed position at a position adjacent to the opening portion. In other words, it is possible to arrange the second fixing portion at a position more toward the first portion. Thus, it is possible to reduce the amount of protrusion of the valve from the mounting portion.

In the above-described valve mounting structure, the cushion may be arranged at a position so that the cushion is held between the valve body and the valve seat when the valve body is closed. With such a configuration, the cushion can inhibit occurrence of vibrations to be generated by contact between the valve body and the valve seat, when the valve body is closed. Thus, this configuration can more preferably inhibit transmission of vibrations generated in the valve to the mounting portion. Furthermore, the cushion is widely arranged up to a position at which the cushion comes into contact with the valve body, thereby reducing leakage of exhaust gas through a gap between the cushion and the valve seat through. Thus, this configuration can inhibit the amount of leakage of the exhaust gas from becoming extremely large.

Furthermore, in the above-described valve mounting structure, a fixed position of the cushion and the first portion and a fixed position of the cushion and the second portion may be provided in an alternating manner along a circumferential direction of the mounting portion. With such a configuration, stress and strain caused by fixing are less likely to be unevenly distributed to specific positions. As a result, it is possible to inhibit the valve being secured in a tilted manner and inhibit separation of the cushion and the first portion, and of the cushion and the second portion (that is, the above-described fixing portions).

Furthermore, in the above-described valve mounting structure, the opening portion may be a cutout formed at an end of the first portion, the end being located adjacent to the second portion. In such a configuration, it is easy to form the opening portion.

In the above-described valve mounting structure, the cushion may be circularly arranged at least between the first portion and the second portion. In such a configuration, the cushion is widely arranged around the mounting portion. This configuration makes it possible to attenuate vibrations and inhibit transmission of the vibrations in a wide area. Moreover, the cushion is circularly arranged along the outer circumference of the mounting portion in a seamless manner. This configuration makes it possible to inhibit an increase in the amount of exhaust gas that leaks from between the first portion and the second portion.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. Embodiment

[1-1. Overall Configuration]

Figure 1:
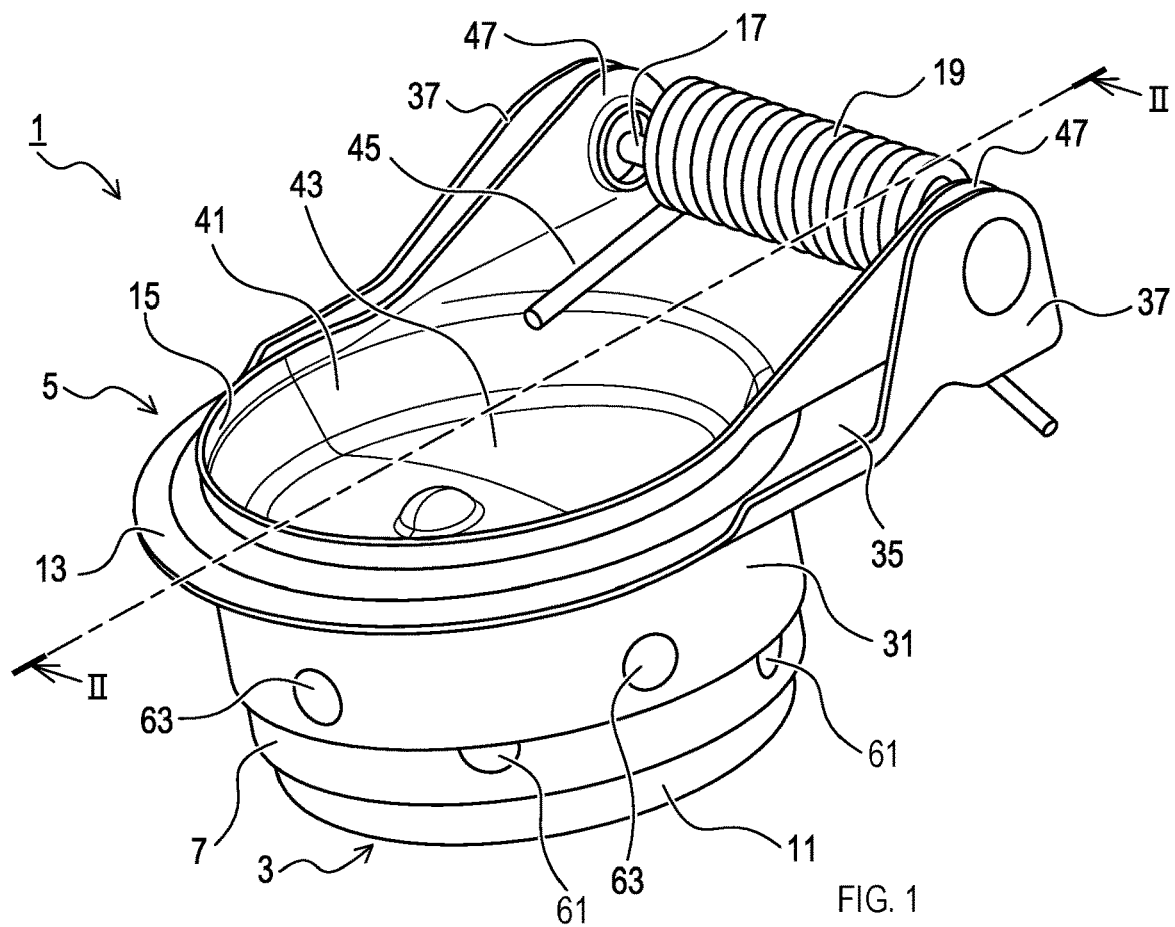
FIG. 1 is a perspective view of a valve mounting structure according to an embodiment.
Figure 2:
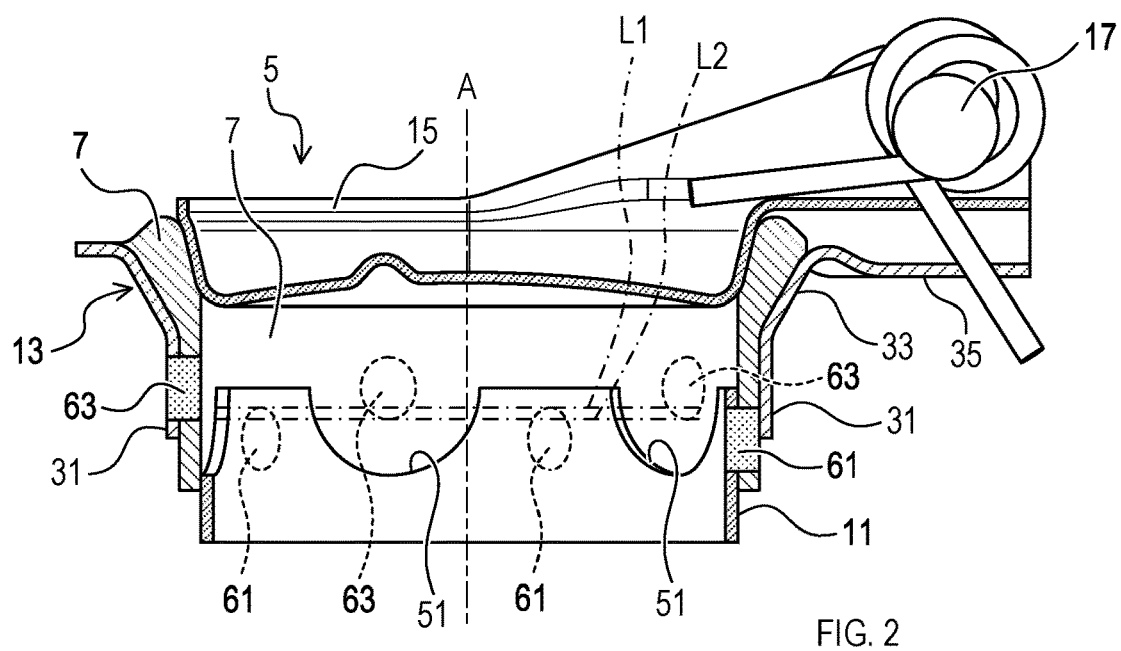
FIG. 2 is a cross-sectional view of the valve mounting structure of FIG. 1 cut along a line II-II.

Referring to FIGS. 1 and 2, a valve mounting structure 1 is a structure for mounting a valve 5 on a mounting portion 11 of an exhaust flow passage 3. The valve mounting structure 1 comprises the valve 5, the mounting portion 11, and a cushion 7. The mounting portion 11 corresponds to one example of the first portion.

In the present embodiment, the exhaust flow passage 3 is a passage through which exhaust gas released from an internal combustion engine of a vehicle is discharged out of the vehicle. The mounting portion 11 is a portion on which the valve 5 is mounted in the exhaust flow passage 3. The mounting portion 11 is a cylindrical piping forming the exhaust flow passage 3. Examples of the mounting portion 11 include an end of an inlet pipe, an end of an outlet pipe, an end of a pipe such as a coupling pipe installed inside a muffler and extending between chambers, and, in a double-pipe structure having an inner pipe and outer pipe, an end of the inner pipe connected to the outer pipe inside the outer pipe. The mounting portion 11 is not limited to these ends, and may be piping attached to these ends.

The mounting portion 11 has cutouts 51 formed on its distal end. In the present embodiment, five cutouts 51 are formed. The distal end of the mounting portion 11 mentioned herein means an end located on the side of the mounting portion 11 in the vicinity of the valve 5. In the following description, a direction toward the valve 5 relative to the mounting portion 11 along a central axis A of the mounting portion 11 illustrated in FIG. 2 will be referred to as a first direction, and a direction toward the mounting portion 11 relative to the valve 5 along the central axis A will be referred to as a second direction. The cutouts 51 refer to portions of the mounting portion 11 provided in an area that is located in the second direction in relation to the end of the mounting portion 11 in the first direction, and where a peripheral wall constituting the mounting portion 11 is not formed. The peripheral wall constituting the mounting portion 11 refers to a cylindrical portion forming a body portion of the mounting portion 11. The cutouts 51 are one example of the opening portion.

The valve 5 includes a valve seat 13, a valve body 15, a rotation shaft 17, and a coil spring 19. The valve seat 13 is mounted on the mounting portion 11 via the cushion 7 and has an opening through which exhaust gas passes. The valve body 15 is coupled to the valve seat 13 via the rotation shaft 17 in a rotatable manner. When the valve body 15 approaches the valve seat 13, the valve body 15 closes the opening, thereby closing the exhaust flow passage. The coil spring 19 is wound around the rotation shaft 17, and biases the valve body 15 toward a position to close the opening of the valve seat 13.

The valve seat 13 includes a joining portion 31, a dilated-diameter portion 33, a flange portion 35, and a pair of shaft supporting portions 37. The joining portion 31 and the dilated-diameter portion 33 are integrally formed into a cylindrical shape. The joining portion 31 extends along the axial direction and has a uniform diameter. The dilated-diameter portion 33 is formed such that the diameter thereof increases with the distance from the joining portion 31 similarly to a truncated cone. The central axis of the joining portion 31 coincides with the central axis of the dilated-diameter portion 33. The joining portion 31 and the dilated-diameter portion 33 form the opening of the valve seat 13. The joining portion 31 receives the above-described end of the mounting portion 11 in the first direction inserted thereto. The joining portion 31 corresponds to one example of the second portion.

The flange portion 35 is a plate-shaped member extending from the rim of the dilated-diameter portion 33 on the side remote from the joining portion 31 along a direction intersecting with the central axis of the dilated-diameter portion 33. The shaft supporting portions 37 extends at two positions spaced apart from each other in the flange portion 35 in a direction away from the joining portion 31 relative to the flange portion 35. That is, both sides of the flange portion 35 are bent in the first direction. The shaft supporting portions 37 support the rotation shaft 17 at specified positions.

The valve body 15 includes an abutting portion 41, a bottom portion 43, a flange portion 45, and a pair of vertical plates 47. The abutting portion 41 is shaped similarly to a truncated cone. The plate-shaped bottom portion 43 is formed to close the rim of the abutting portion 41 on the tapered side. The flange portion 45 is a plate-shaped member extending from the rim of the abutting portion 41 located on the opposite side of the bottom portion 43 along a direction intersecting with the central axis of the abutting portion 41. The vertical plates 47 extend from two positions spaced apart from each other in the flange portion 45 in a direction away from the bottom portion 43 relative to the flange portion 45. Each of the vertical plates 47 has a through hole to allow the rotation shaft 17 to pass therethrough. This configuration makes the valve body 15 rotatable on the rotation shaft 17. When the valve body 15 closes the opening of the valve seat 13, the abutting portion 41 enters, from the side where the bottom portion 43 is located, the valve seat 13 through the opening of the valve seat 13, and thereby faces the dilated-diameter portion 33.

The cushion 7 on the whole is almost cylindrically shaped. As illustrated in FIG. 2, the cushion 7 is arranged around the mounting portion 11, and partly positioned inside the opening of the valve seat 13. In other words, the cushion 7 is arranged between the mounting portion 11 and the joining portion 31 of the valve seat 13. More specifically, a portion of the cushion 7 in the second direction is arranged to surround the mounting portion 11. In addition, a portion of the cushion 7 in the first direction is arranged inside the opening of the valve seat 13 to cover the inner-circumferential surface of the joining portion 31 and the dilated-diameter portion 33.

The cushion 7 is a wire mesh formed by weaving thread-shaped metal, or intertwining thread-shaped metal without weaving. The wire mesh is thick and elastically deformable. Such a cushion 7 attenuates vibrations of the valve 5. In addition, the cushion 7 is held between the valve seat 13 and the valve body 15 when the valve body 15 closes the opening. The above-mentioned central axis A coincides with the central axes of the cushion 7, the joining portion 31, and the dilated-diameter portion 33.

The cushion 7 is fixed to both the mounting portion 11 and the joining portion 31 of the valve seat 13. The cushion 7 may be fixed by spot-welding. First fixing portions 61 in which the cushion 7 and the mounting portion 11 are welded together and second fixing portions 63 in which the cushion 7 and the joining portion 31 are welded together are arranged at different positions. The first fixing portions 61 are provided at positions where the cushion 7 overlaps with the mounting portion 11. The second fixing portions 63 are provided at positions where the cushion 7 overlaps with the joining portion 31 but does not overlap the mounting portion 11. In addition, the second fixing portions 63 are provided at positions where the second fixing portions 63 are partly arranged adjacent to the cutouts 51 along the radial direction of the mounting portion 11. In other words, the second fixing portions 63, when viewed radially outward from the position of the central axis A, are provided such that some part of the second fixing portions 63 overlap with the cutouts 51. It can be also said that the second fixing portions 63 are partly provided inside the cutouts 51. The radial direction mentioned herein extends from the central axis A on a plane orthogonal to the central axis A of the mounting portion 11.

The first fixing portions 61 are provided at five locations between the five the cutouts 51. The second fixing portions 63 are provided at five locations adjacent to the five the cutouts 51. The five first fixing portions 61 and the five second fixing portions 63 are provided in an alternating manner along the circumferential direction of the mounting portion 11. That is, fixed positions at which the cushion 7 and the mounting portion 11 are fixed to each other and fixed positions at which the cushion 7 and the joining portion 31 are fixed to each other are provided in an alternating manner along the circumferential direction of the mounting portion 11. More preferably these fixed positions are provided in an alternating manner and an equidistant manner.

In comparison between a straight line L1 connecting the ends of the five first fixing portions 61 in the first direction and a straight line L2 connecting ends of the five second fixing portion 63 in the second direction, the straight line L1 is located in the first direction relative to the straight line L2. That is, the area of the first fixing portions 61 and the area of the second fixing portions 63 partly overlap with each other along the direction of the central axis A.

In the mounting structure described above, the valve 5 opens and closes at least a portion of the exhaust flow passage 3. A state in which the valve body 15 is positioned the closest to the valve seat 13 is a closed state of the valve 5. A not-shown state in which the valve body 15 is positioned farthest from the valve seat 13 against the coil spring 19 is a most widely opened state of the valve 5. In the closed state of the valve 5, the opening of the valve 5 does not have to be completely closed. In the present embodiment, some of exhaust gas passes through gaps of the wire mesh, thus being able to pass through the closed valve 5.

[1-2. Example Usage of Mounting Structure]

Figure 3:
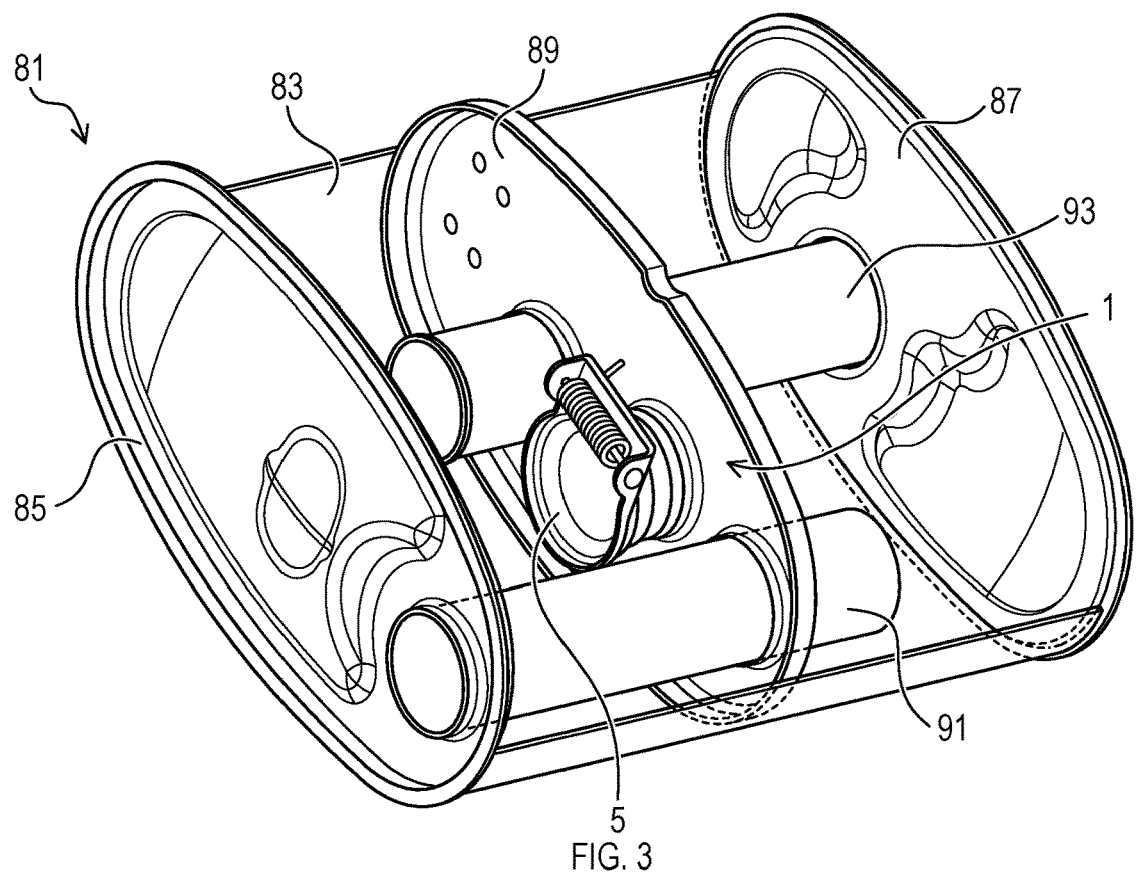
FIG. 3 is a perspective view of a muffler in which the valve mounting structure of the embodiment is used.
Figure 4:
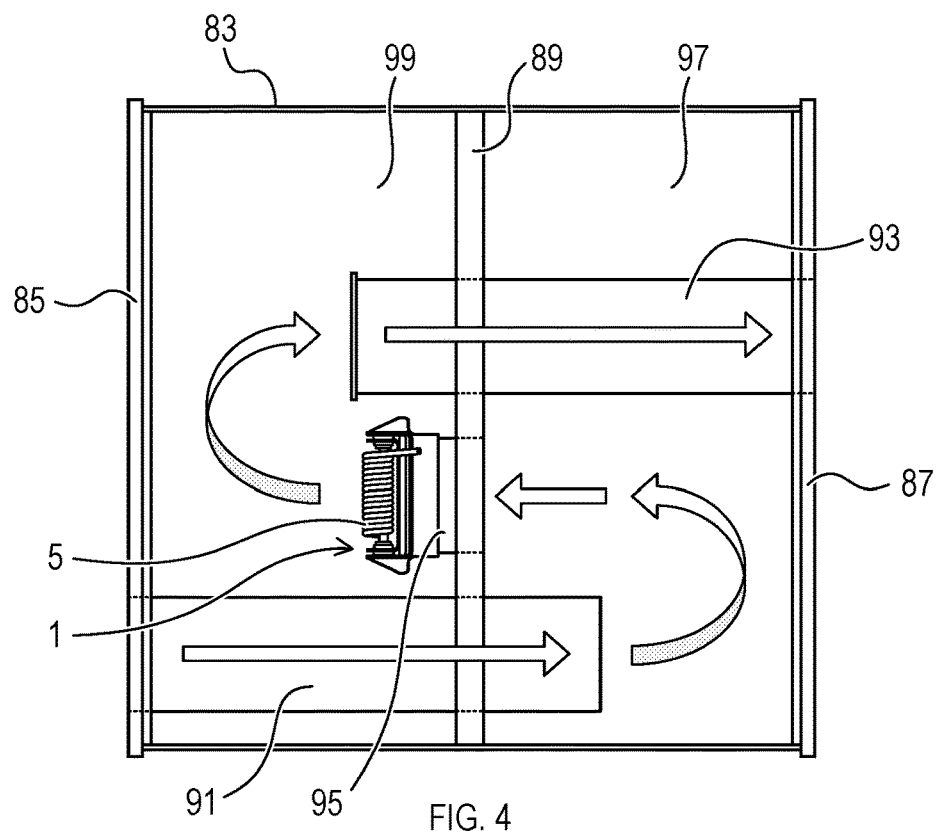
FIG. 4 is a schematic lateral view of the muffler illustrating a flow of exhaust gas.

The valve 5 may be mounted on objects other than cylindrical piping. FIG. 3 and FIG. 4 illustrate an example in which the valve 5 is mounted on a separator 89 of a muffler 81. The muffler 81 includes a cylindrical body 83 forming an outer shell, a first closure portion 85, a second closure portion 87, the separator 89 partitioning the outer shell, an inlet pipe 91, and an outlet pipe 93. Formed on the separator 89 is a cylindrical mounting portion 95, and, on the mounting portion 95, the valve 5 is mounted.

In such a muffler 81, exhaust gas flowing through the inlet pipe 91 enters a first chamber 97, then entering a second chamber 99 through the opening of the valve 5. Subsequently, the exhaust gas is discharged through the outlet pipe 93.

[1-3. Effects]

According to the embodiment described above, the following effects can be achieved.

(1a) In the valve mounting structure 1, vibrations generated in the valve seat 13 when the valve body 15 is closed are attenuated by the cushion 7, and are inhibited by the cushion 7 from being transmitted to the mounting portion 11. In addition, the first fixing portions 61 and the second fixing portions 63 are provided at positions away from each other. This configuration makes it possible to achieve a better vibration attenuating effect by the cushion 7 as compared with a case where the first fixing portions 61 and the second fixing portions 63 are provided at the same positions or at positions very close to each other. From these reasons, it is possible to reduce generation of a chattering noise caused by exhaust pulsation.

Figure 5:
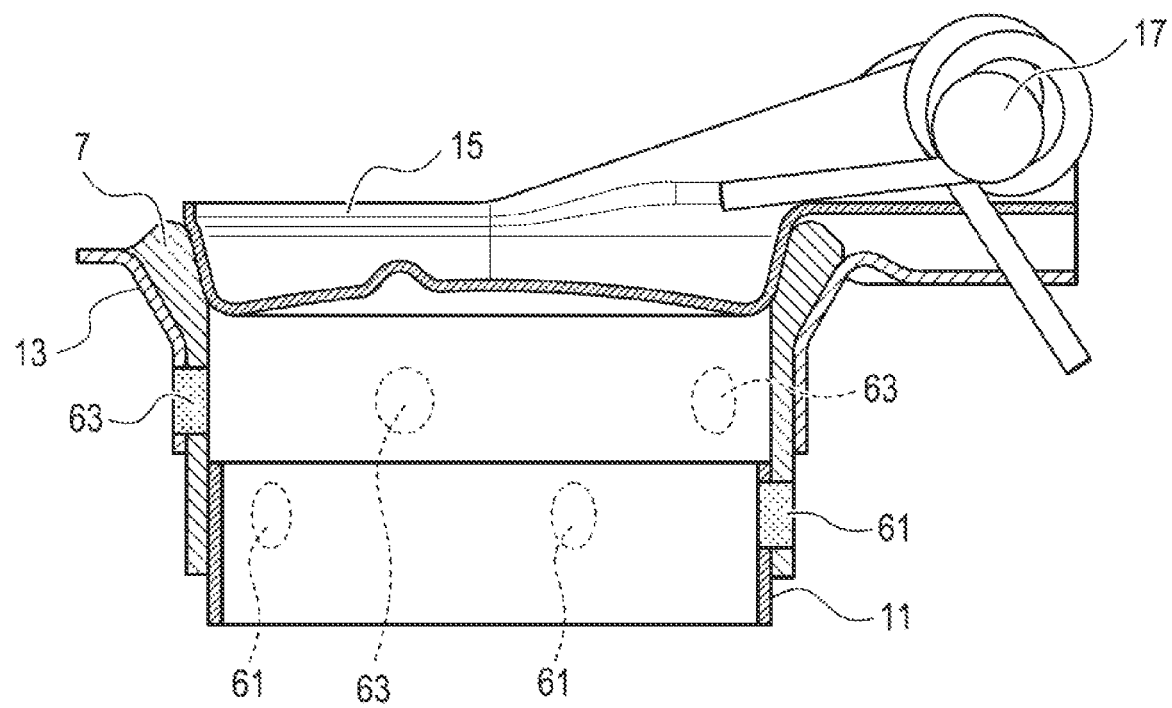
FIG. 5 is a cross-sectional view of a valve mounting structure according to a reference example.

As illustrated in FIG. 5, in a case where the cutouts 51 are not formed in the mounting portion 11, the valve seat 13 is arranged farther in the first direction relative to the mounting portion 11. This is because it is difficult to form the second fixing portions 63 by spot-welding at positions where the mounting portion 11 exists. As a result, the distance from the mounting portion 11 to the end of the valve 5 in the first direction would be larger than the distance in the valve mounting structure 1. In contrast, in the valve mounting structure 1 according to the above-described embodiment, the second fixing portions 63 are arranged adjacent to the cutouts 51 provided in the mounting portion 11 along the radial direction. This configuration allows the valve 5 to be arranged closer to the mounting portion 11. As a result, it is possible to downsize a valve mounting structure in an exhaust flow passage.

(1b) The cushion 7 is held between the valve body 15 and the valve seat 13 when the valve body 15 is closed. Accordingly, the cushion 7 can inhibit occurrence of vibrations to be generated by contact between the valve body 15 and the valve seat 13, when the valve body 15 is closed. Thus, this configuration can more preferably inhibit transmission of vibrations generated in the valve 5 to the mounting portion 11. Furthermore, the cushion 7 is widely arranged adjacent to the valve seat 13. This configuration reduces leakage of exhaust gas through a gap between the cushion 7 and the valve seat 13. Thus, it is possible to inhibit the amount of leakage of exhaust gas from between the cushion 7 and the valve seat 13 from becoming extremely large.

(1c) In the valve mounting structure 1, the first fixing portions 61 and the second fixing portions 63 are provided in an alternating manner along the circumferential direction of the mounting portion 11. In other words, the fixed positions at which the cushion 7 and the first portions are fixed to each other and the fixed positions at which the cushion 7 and the second portions are fixed to each other are provided in an alternating manner along the circumferential direction of the mounting portion 11. With this configuration, stress and strain caused by the fixing are less likely to be unevenly distributed to specific positions. Thus, it is possible to inhibit the valve 5 from being secured in a tilted manner and inhibit separation of the first fixing portions 61 and the second fixing portions 63.

(1d) In the valve mounting structure 1, the cushion 7 is cylindrically shaped, thus being widely arranged around the mounting portion 11. This configuration makes it possible to attenuate vibrations and inhibit transmission of the vibrations in a wide area. Furthermore, the cushion 7 is circularly arranged along the outer circumference of the mounting portion 11 in a seamless manner. This configuration makes it possible to inhibit an increase in the amount of exhaust gas that leaks from between the mounting portion 11 and the joining portion 31.

2. Other Embodiments

An embodiment of the present disclosure has been described hereinabove. However, it goes without saying that the present disclosure should not be limited to the above-described embodiment, and may be modified in various manners within the technical scope of the present disclosure.

(2a) In the above-described embodiment, a mounting structure for attaching a valve to the exhaust flow passage 3 of an internal combustion engine of a vehicle is illustrated as an example. However, the exhaust flow passage is not limited to particular types of exhaust flow passage, and may be any piping that allows a passage of exhaust gas. For example, the mounting structure of the present disclosure may be used for exhaust flow passages installed in systems other than vehicles, and the mounting structure of the present disclosure may be used for exhaust flow passages for discharging substances other than exhaust gas of internal combustion engines.

(2b) In the above-described embodiment, a valve that is opened and closed by the valve body 15 moving around the rotation shaft 17 arranged outside the opening of the valve seat 13 is illustrated as an example. However, the configuration of valves for which the mounting structure of the present disclosure can be adopted is not limited to particular configurations. It should be noted that any valves that generate a hitting noise when opening and closing can make a good use of the silencing effect of the mounting structure of the present disclosure.

(2c) In the above-described embodiment, a wire mesh is illustrated as an example of the cushion 7. However, the specific material, shape, and so on of the cushion 7 are not limited to particular types, and may be any types that can attenuate and absorb vibrations. For example, a component that includes a highly flexible material as compared with materials used the mounting portion 11, the valve seat 13, and the valve body 15 may be used as the cushion 7. It should be noted that, in a case where a valve is used in systems in which exhaust gas with a high temperature is discharged, it is desirable that a material with high heat resistance is used for the cushion 7.

Figure 6:
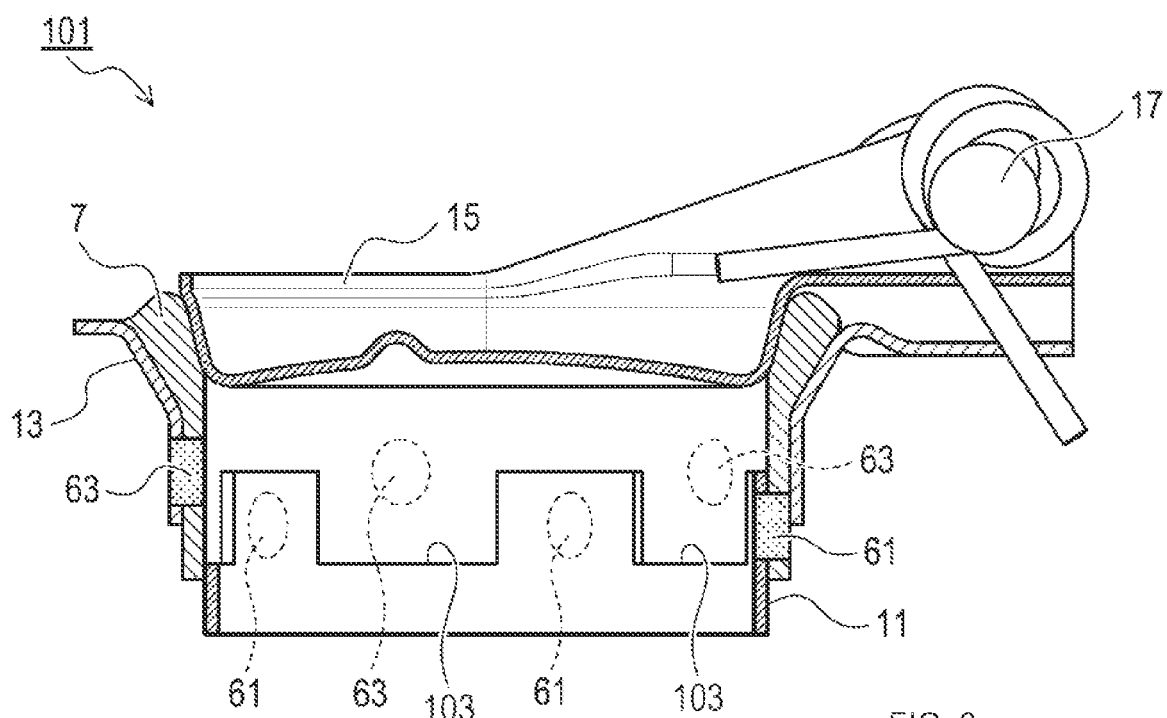
FIG. 6 is a cross-sectional view of a valve mounting structure according to a modified example.
Figure 7:
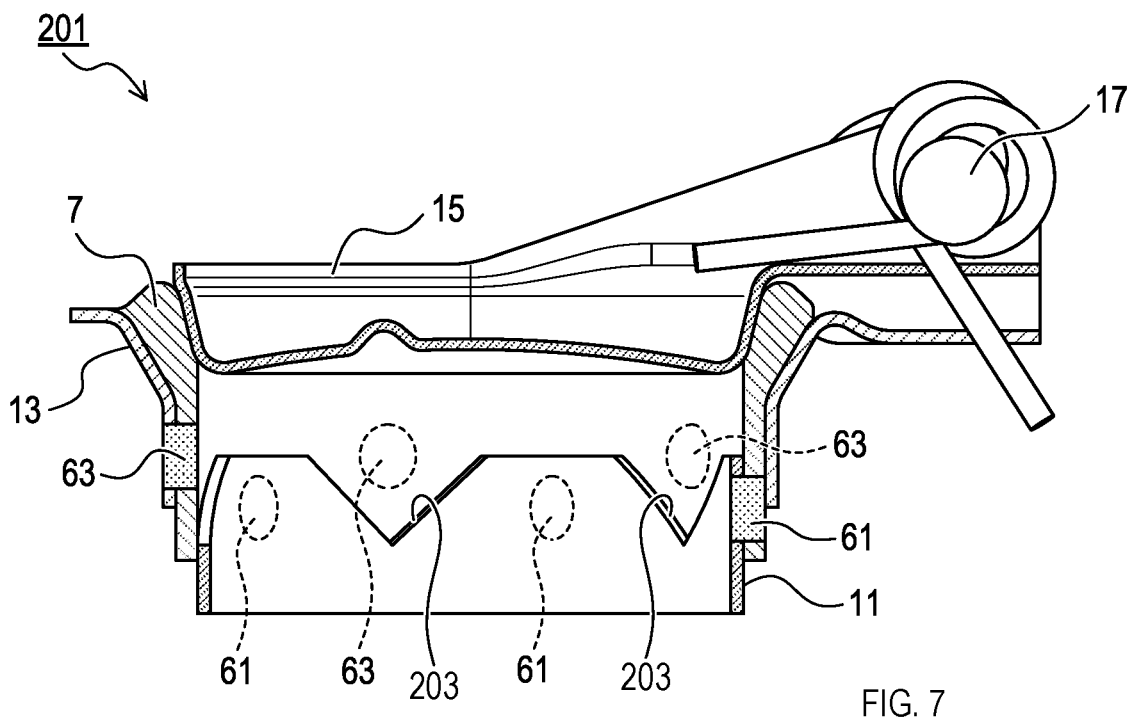
FIG. 7 is a cross-sectional view of a valve mounting structure according to another modified example.
Figure 8:
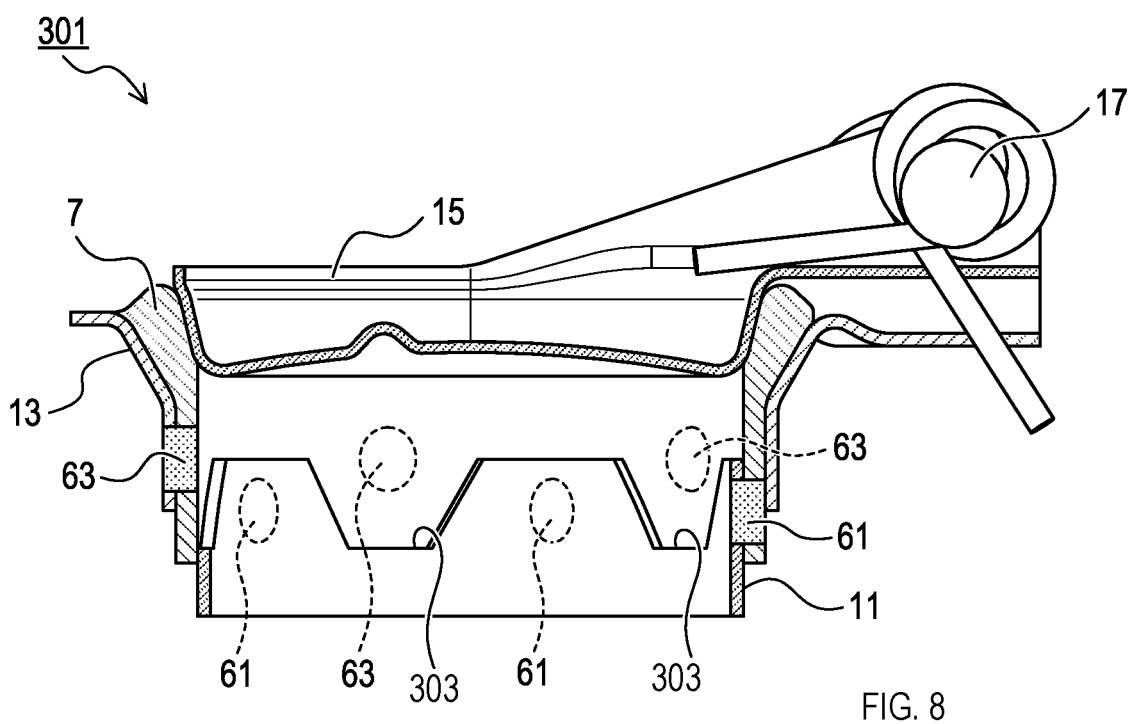
FIG. 8 is a cross-sectional view of a valve mounting structure according to still another modified example.

(2d) In the above-described embodiment, the cutouts 51 are illustrated as an example of the opening portion. However, the specific shape of the opening portion is not limited to the shape of the above-described cutouts 51. For example, as illustrated in a valve mounting structure 101 in FIG. 6, the mounting portion 11 may have a configuration in which rectangular cutouts 103 are provided. Furthermore, as illustrated in a valve mounting structure 201 in FIG. 7, the mounting portion 11 may have a configuration in which V-shaped cutouts 203 are provided. Still furthermore, as illustrated in a valve mounting structure 301 in FIG. 8, the mounting portion 11 may have a configuration in which trapezoidally shaped cutouts 303 are provided. As described above, the shape of the cutouts may be selected from various shapes such as triangular, quadrangular, and arc shapes.

It is relatively easy to form the cutouts along the end of the mounting portion 11. In addition, the cutouts are less likely to interfere with the valve seat 13 during manufacturing. Thus, forming the cutouts as the opening portion is convenient for manufacturing.

Figure 9:
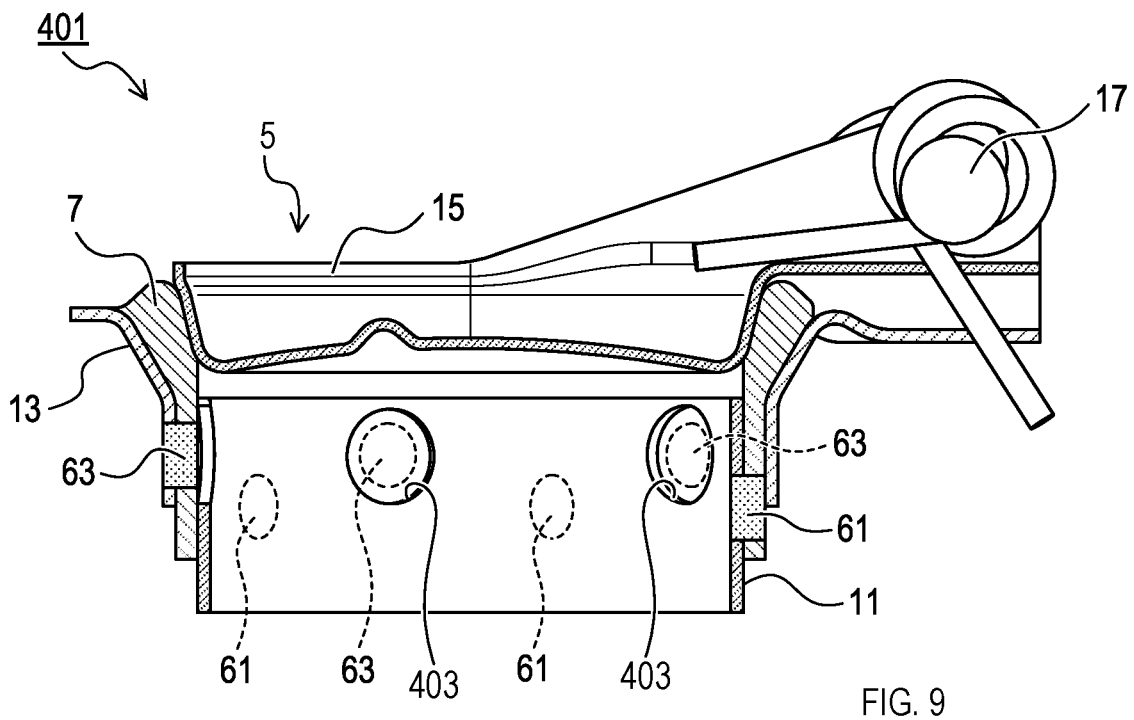
FIG. 9 is a cross-sectional view of a valve mounting structure according to still another modified example.

Moreover, the opening portion may have a shape different from the shapes of cutouts. Suppose that one of the mounting portion 11 and the joining portion 31 is referred to as a first portion and the other is referred to as a second portion, the opening portion may be at least partly formed in an area of the first portion that is located away from the second portion relative to the end of the first portion in the vicinity of the second portion. That is, in a case where the mounting portion 11 is referred to as the first portion, the opening portion may be formed an area of the mounting portion 11 that does not include the distal end of the mounting portion 11 in the first direction. Specifically, as illustrated in a valve mounting structure 401 in FIG. 9, the mounting portion 11 may have circular through holes 403. The through holes 403 are formed at positions away from the valve 5 relative to the distal end of the mounting portion 11. The specific shape of the through holes 403 is not limited to a particular shape. For example, the through holes 403 may be formed in a polygonal shape such as a rectangular shape, or an oval shape. The opening portion may be formed by suitably combining a cutout and a through hole.

Figure 10:
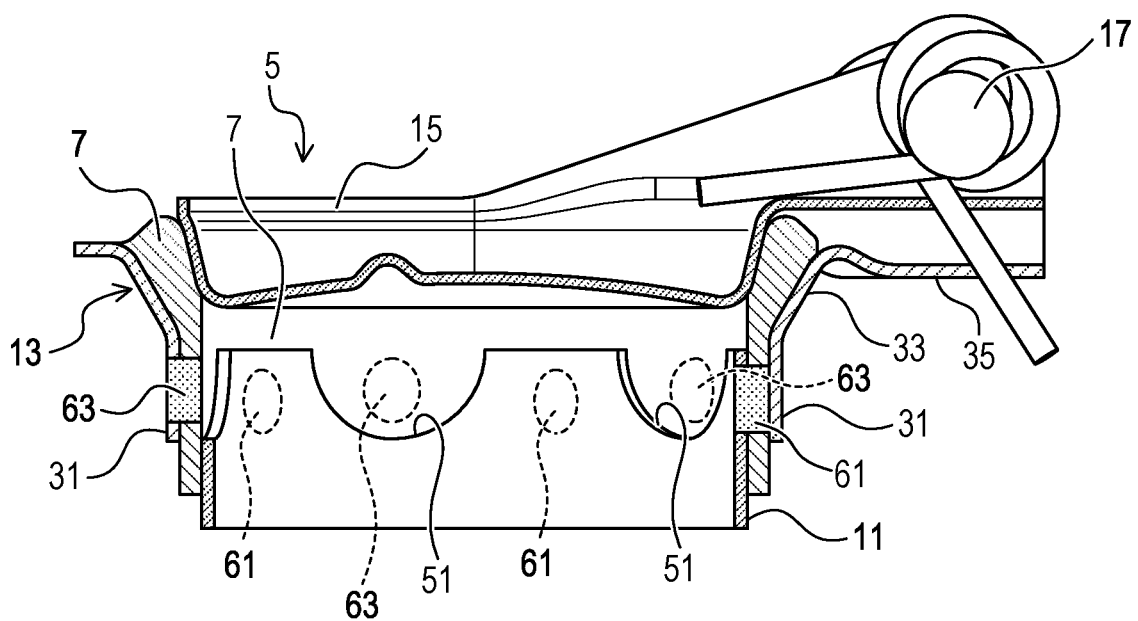
FIG. 10 is a cross-sectional view of a valve mounting structure according to still another modified example.

In the above-described embodiment, a configuration is illustrated as an example in which the second fixing portions 63 are partly arranged adjacent to the cutouts 51. As illustrated in FIG. 10, the second fixing portions 63 may be entirely arranged adjacent to the cutouts 51. In other words, the second fixing portions 63 may be arranged to completely coincide with the cutouts 51, when viewed radially outward from the central axis A. In FIG. 10, the positions of the first fixing portions 61 almost correspond to the positions of the second fixing portions 63 along the axial direction. This configuration can make the amount of protrusion of the valve 5 from the mounting portion 11 small.

Figure 11:
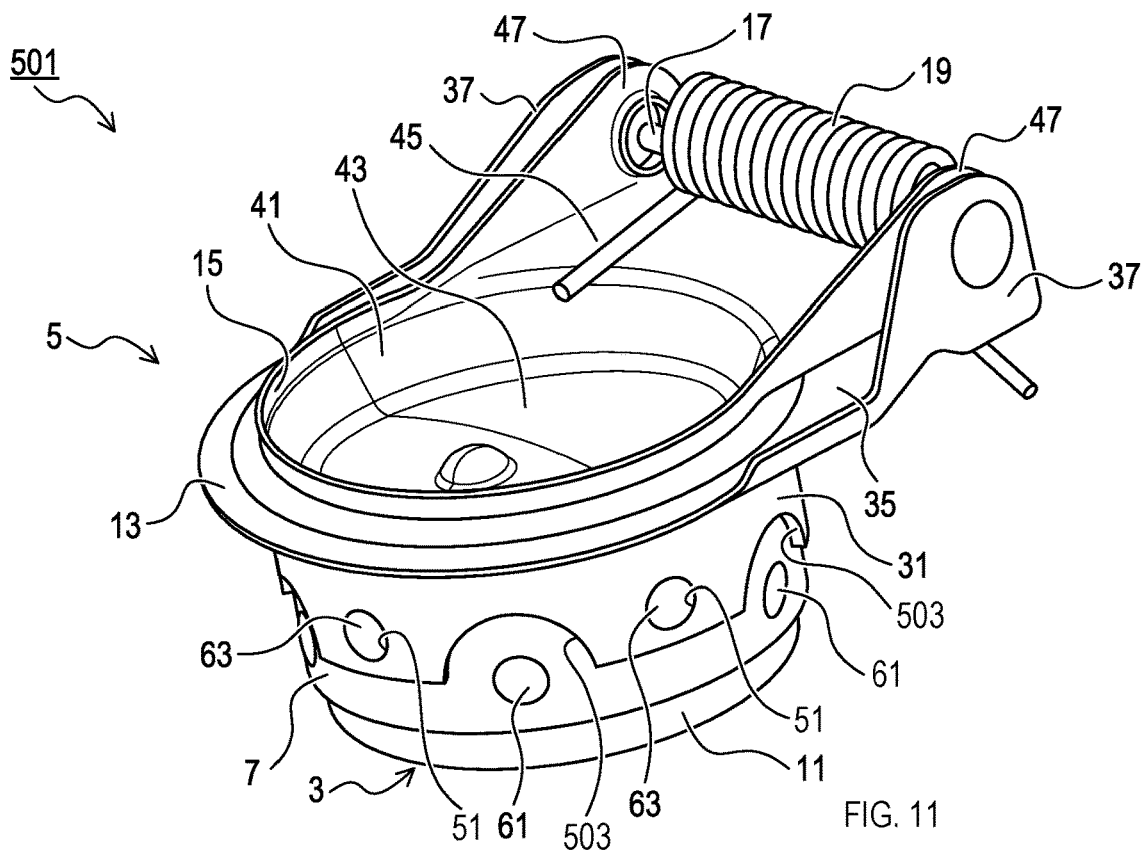
FIG. 11 is a perspective view of a valve mounting structure according to still another modified example.
Figure 12:
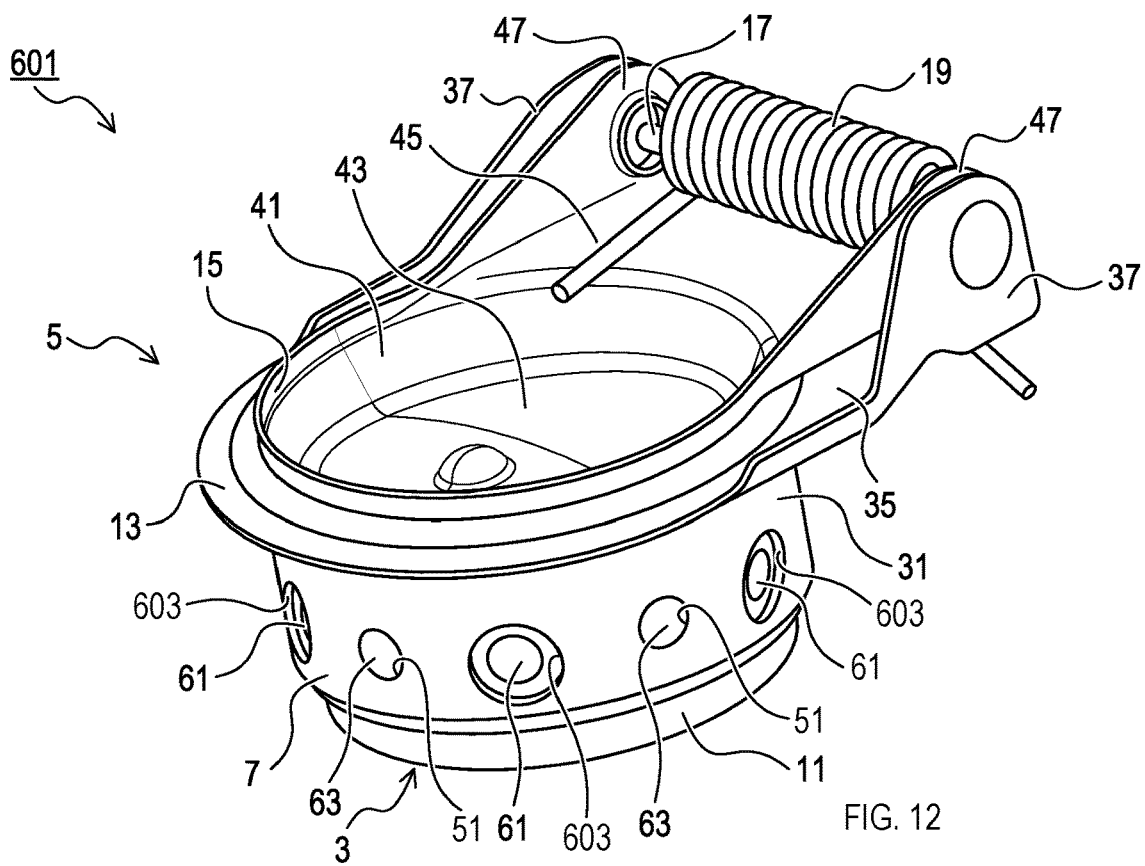
FIG. 12 is a perspective view of a valve mounting structure according to still another modified example.

(2e) In the above-described embodiment, a configuration is illustrated as an example in which the mounting portion 11 is the first portion and the joining portion 31 is the second portion. In other words, in the above-described embodiment, a configuration in which the cutouts 51, which are one example of the opening portion, are formed only in the mounting portion 11. However, the mounting portion 11 may be the second portion and the joining portion 31 may be the first portion, and the opening portion may be provided in the joining portion 31. For example, as illustrated in a valve mounting structure 501 in FIG. 11, cutouts 503 may be formed at the end of the joining portion 31 located adjacent to the mounting portion 11. In this configuration, the first fixing portions 61 are provided at positions where the first fixing portions 61 are at least partly adjacent to the cutouts 503 along the radial direction. For another example, as illustrated in a valve mounting structure 601 in FIG. 12, through holes 603 may be formed in the joining portion 31. In this configuration, the first fixing portions 61 are arranged at positions adjacent to the through holes 603 along the radial direction.

(2f) In the above-described embodiment, a configuration is illustrated as an example in which, as described with the straight line L1 and the straight line L2 in FIG. 2, the area of the first fixing portions 61 and the area of the second fixing portions 63 along the direction of the central axis A partly overlap with each other. However, the area of the first fixing portions 61 and the area of the second fixing portions 63 along the direction of the central axis A do not have to overlap with each other. The downsize effect according to the present disclosure can be sufficiently achieved as long as the second fixing portions 63 are arranged adjacent to the cutouts 51.

(2g) In the above-described embodiment, a configuration is illustrated as an example in which the first fixing portions 61 and the second fixing portions 63 are provided in an alternating manner along the circumferential direction of the mounting portion 11. However, the arrangement the fixed positions of the first and second fixing portions is not limited to the above-described arrangement. For example, the first fixing portions 61 and the second fixing portions 63 may be unevenly distributed relative to the central axis A. In this case, the number of the first fixing portions 61 and the number of the second fixing portions 63 may be different.

Furthermore, in the above-described embodiment, a configuration is illustrated as an example in which the first fixing portions 61 and the second fixing portions 63 are equidistantly provided. However, the first fixing portions 61 and the second fixing portions 63 do not have to be equally spaced from each other.

(2h) In the above-described embodiment, a configuration is illustrated as an example in which the cushion 7 is arranged surrounding the outer circumference of the mounting portion 11. However, the cushion 7 may be arranged around a portion of the mounting portion 11 along the circumference direction. In other words, the cushion 7 does not have to be cylindrically formed.

(2i) In the above-described embodiment, a method is illustrated as an example in which the cushion 7 and the valve seat 13, and the cushion 7 and the joining portion 31 are fixed by spot-welding. However, the cushion 7 and the valve seat 13, and the cushion 7 and the joining portion 31 may be fixed by other types of welding apart from spot-welding. Alternatively, the cushion 7 and the valve seat 13, and the cushion 7 and the joining portion 31 may be fixed by other approach apart from welding.

(2j) In the above-described embodiment, a configuration is illustrated as an example in which the cushion 7 held between the mounting portion 11 and the valve seat 13 is arranged on the inner surface of the valve seat 13 to inhibit a hitting noise of the valve seat 13 and the valve body 15. However, a cushioning component that inhibits a hitting noise of the valve seat 13 and the valve body 15 may be arranged at a position different from the position of the cushion 7. The cushioning component that inhibits a hitting noise of the valve seat 13 and the valve body 15 may be optional. A configuration without a cushioning component can inhibit an increase in size of the valve mounting structure in an exhaust flow passage.

(2k) In the above-described embodiment, a configuration is illustrated as an example in which the mounting portion 11 is inserted to the cylindrical joining portion 31. However, the configuration may be such that the joining portion 31 is inserted to the mounting portion 11.

(2l) Functions of one component in the aforementioned embodiments may be achieved by two or more components, and a function of one component may be achieved by two or more components. Furthermore, functions of two or more components may be achieved by one component, and a function achieved by two or more components may be achieved by one component. Some of the components of the above embodiments may be omitted. At least part of the configurations of the aforementioned embodiments may be added to or replaced with other configurations of the aforementioned embodiments.

What is claimed is:

1. A valve mounting structure comprising:
a cylindrical mounting portion defining an exhaust flow passage;
a valve mounted to the mounting portion, the valve including:
a valve seat including a cylindrical joining portion configured to receive the mounting portion; and
a valve body configured to close the exhaust flow passage, and
a cushion fixed between the mounting portion and the joining portion,
wherein the mounting portion includes a peripheral wall with a plurality of recessed opening portions, and
wherein the mounting portion is fixed to the cushion via a plurality of first fixing portions, and the cushion is fixed to the joining portion via a plurality of second fixing portions, and
wherein the plurality of second fixing portions is at least partially arranged at positions corresponding to the plurality of opening portions along a circumferential direction of the mounting portion.

2. The valve mounting structure according to claim 1, wherein the cushion is configured to be held between the valve body and the valve seat when the valve body is closed.

3. The valve mounting structure according to claim 1, wherein the plurality of first fixing portions and the plurality of second fixing portions are provided in an alternating manner along the circumferential direction of the mounting portion.

4. The valve mounting structure according to claim 1, wherein each opening portion is a cutout formed at a first end of the mounting portion, the first end being proximate to the joining portion.

5. A valve mounting structure comprising:
a cylindrical mounting portion defining an exhaust flow passage;
a valve mounted to the mounting portion, the valve including:
a valve seat including a cylindrical joining portion configured to receive the mounting portion; and
a valve body configured to close the exhaust flow passage; and
a cushion fixed between the mounting portion and the joining portion,
wherein the joining portion includes a peripheral wall with a plurality of recessed opening portions,
wherein the mounting portion is fixed to the cushion via a plurality of first fixing portions, and the cushion is fixed to the joining portion via a plurality of second fixing portions, and wherein the plurality of first fixing portions is at least partially arranged at positions corresponding to the plurality of opening portions along a circumferential direction of the joining portion.

6. The valve mounting structure according to claim 5, wherein the cushion is configured to be held between the valve body and the valve seat when the valve body is closed.

7. The valve mounting structure according to claim 5, wherein the plurality of first fixing portions and the plurality of second fixing portions are provided in an alternating manner along the circumferential direction of the joining portion.

8. The valve mounting structure according to claim 5, wherein each opening portion is a cutout formed at a first end of the joining portion, the first end being proximate to the mounting portion.

* * * * *